(12) United States Patent
Kholodkova et al.

(10) Patent No.: US 10,877,459 B2
(45) Date of Patent: Dec. 29, 2020

(54) APPARATUS FOR OUTLINING ON VERTICAL SURFACE AND METHODS OF USE

(71) Applicants: Yelizaveta Kholodkova, Palm City, FL (US); Grigory Kholodkov, Palm City, FL (US)

(72) Inventors: Yelizaveta Kholodkova, Palm City, FL (US); Grigory Kholodkov, Palm City, FL (US)

( * ) Notice: Subject to any disclaimer, the term of this patent is extended or adjusted under 35 U.S.C. 154(b) by 395 days.

(21) Appl. No.: 15/586,949

(22) Filed: May 4, 2017

(65) Prior Publication Data

US 2017/0322539 A1    Nov. 9, 2017

Related U.S. Application Data

(60) Provisional application No. 62/331,637, filed on May 4, 2016.

(51) Int. Cl.
| | |
|---|---|
| *G05B 19/402* | (2006.01) |
| *B43L 13/00* | (2006.01) |
| *B44B 3/00* | (2006.01) |
| *B44B 3/02* | (2006.01) |
| *B43L 13/02* | (2006.01) |

(52) U.S. Cl.
CPC ............ *G05B 19/402* (2013.01); *B43L 13/00* (2013.01); *B43L 13/022* (2013.01); *B44B 3/009* (2013.01); *B44B 3/02* (2013.01); *G05B 2219/45013* (2013.01); *G05B 2219/45041* (2013.01); *G05B 2219/45094* (2013.01); *G05B 2219/45212* (2013.01)

(58) Field of Classification Search
CPC ........ G05B 19/402; G05B 2219/45094; G05B 2219/45212; G05B 2219/45013; G05B 2219/45041; B43L 13/022; B43L 13/00; B44B 3/02; B44B 3/009
See application file for complete search history.

(56) References Cited

U.S. PATENT DOCUMENTS

| | | | | |
|---|---|---|---|---|
| 2,193,854 A | * | 3/1940 | Benedict | .................. B24B 3/36 451/349 |
| 2,413,300 A | * | 12/1946 | Dunn | ..................... G01C 21/14 340/990 |
| 2,504,832 A | * | 4/1950 | Groome | .................. B43L 11/05 33/30.7 |

(Continued)

*Primary Examiner* — Nimeshkumar D Patel
*Assistant Examiner* — Tania Courson
(74) *Attorney, Agent, or Firm* — Smith, Gambrell & Russell, LLP.

(57) ABSTRACT

The present invention provides for a wall mountable system for automated drawing of an image upon a wall which includes a horizontal mounting track for mounting on a wall, a robot having a y-track rigidly mounted it where the robot and the mounted y-track travel along the horizontal track. An end effector, which includes a pen holding mechanism holding a pen, is in electrical communication with the robot and travels along the y-track of the robot. The present invention provides a system and device that can attach to a wall or vertical surface in a damage-free manner and draw fast any complexity or style image of custom size in both the horizontal (X) and vertical (Y) directions, that is easy to remove and transport and require small floor space to operate.

19 Claims, 8 Drawing Sheets

(56) References Cited

U.S. PATENT DOCUMENTS

| | | | | |
|---|---|---|---|---|
| 2,548,202 A * | 4/1951 | Davenport | G01C 17/00 | 33/445 |
| 2,660,147 A * | 11/1953 | Bowditch | G01D 13/22 | 116/331 |
| 2,713,723 A * | 7/1955 | Anderson | B43L 13/005 | 33/435 |
| 2,727,308 A * | 12/1955 | Kuhn, Jr. | G01C 21/14 | 33/18.1 |
| 2,863,361 A * | 12/1958 | Daugherty | B23Q 35/00 | 409/118 |
| 2,944,866 A * | 7/1960 | Moseley | G01D 9/32 | 346/8 |
| 3,193,833 A * | 7/1965 | Davies | G07C 3/005 | 346/8 |
| 3,241,454 A * | 3/1966 | Medley, Jr. | B23Q 35/20 | 409/94 |
| 3,363,319 A * | 1/1968 | Greer | B43L 13/028 | 33/32.1 |
| 3,473,009 A * | 10/1969 | Heinz | G06K 15/22 | 318/574 |
| 3,531,868 A * | 10/1970 | Stevenson | G01B 7/008 | 33/503 |
| 3,566,479 A * | 3/1971 | Pascoe et al. | G01B 7/008 | 33/503 |
| 3,668,956 A * | 6/1972 | Whipple | B26D 3/085 | 83/881 |
| 3,714,714 A * | 2/1973 | Bullard, III | B43L 13/022 | 33/445 |
| 3,753,384 A * | 8/1973 | Anfindsen | B23B 29/12 | 409/293 |
| 3,778,905 A * | 12/1973 | Jebb | B25H 7/04 | 33/18.1 |
| RE28,121 E * | 8/1974 | Gulley | B23K 37/0217 | 173/32 |
| 4,012,027 A * | 3/1977 | Hooper | B23K 7/004 | 266/58 |
| 4,067,555 A * | 1/1978 | Vignardet | B23K 7/002 | 266/58 |
| 4,192,487 A * | 3/1980 | Krieg | B23K 7/105 | 266/58 |
| 4,278,015 A * | 7/1981 | Weaver | F16P 3/20 | 100/215 |
| 4,335,986 A * | 6/1982 | Fahrner | B21D 1/14 | 409/116 |
| 4,419,823 A * | 12/1983 | Thorban | B23Q 1/28 | 33/1 M |
| 4,420,886 A * | 12/1983 | Amano | G06K 15/22 | 33/1 M |
| 4,466,069 A * | 8/1984 | Balfanz | B23K 7/002 | 266/58 |
| 4,524,894 A * | 6/1985 | Leblond | B26F 1/3806 | 225/2 |
| 4,547,968 A * | 10/1985 | Petersen | G01D 9/30 | 33/32.1 |
| 4,624,169 A * | 11/1986 | Nelson | B26D 3/085 | 33/1 M |
| 4,713,887 A * | 12/1987 | Kitamura | B23Q 1/621 | 33/1 M |
| 4,833,785 A * | 5/1989 | Parent | B05B 13/04 | 33/1 M |
| 4,876,789 A * | 10/1989 | Burwell | B23D 49/003 | 29/560 |
| 5,005,296 A * | 4/1991 | Gerber | B43L 13/024 | 33/18.1 |
| 5,056,229 A * | 10/1991 | Carlson | B63H 9/0657 | 33/1 M |
| 5,197,198 A * | 3/1993 | Onozato | B26F 1/3806 | 33/1 M |
| 5,350,898 A * | 9/1994 | Higashiguchi | B23Q 1/625 | 219/221 |
| 5,381,713 A * | 1/1995 | Smith | C03B 33/027 | 83/582 |
| 5,388,488 A * | 2/1995 | Geidl | B23Q 17/2233 | 83/455 |
| 7,478,597 B2 * | 1/2009 | Schroeder | B66C 5/02 | 104/137 |
| 7,784,762 B2 * | 8/2010 | Klein | F16M 11/10 | 227/31 |
| 10,207,722 B2 * | 2/2019 | Berg | B61F 5/04 | |
| 10,279,483 B2 * | 5/2019 | Gosselin | B25J 3/04 | |
| 2004/0060180 A1 * | 4/2004 | Nelson | B44B 3/063 | 33/18.1 |
| 2017/0235293 A1 * | 8/2017 | Shapiro | G05B 19/406 | 700/166 |
| 2019/0310604 A1 * | 10/2019 | Shapiro | B23K 26/082 | |

* cited by examiner

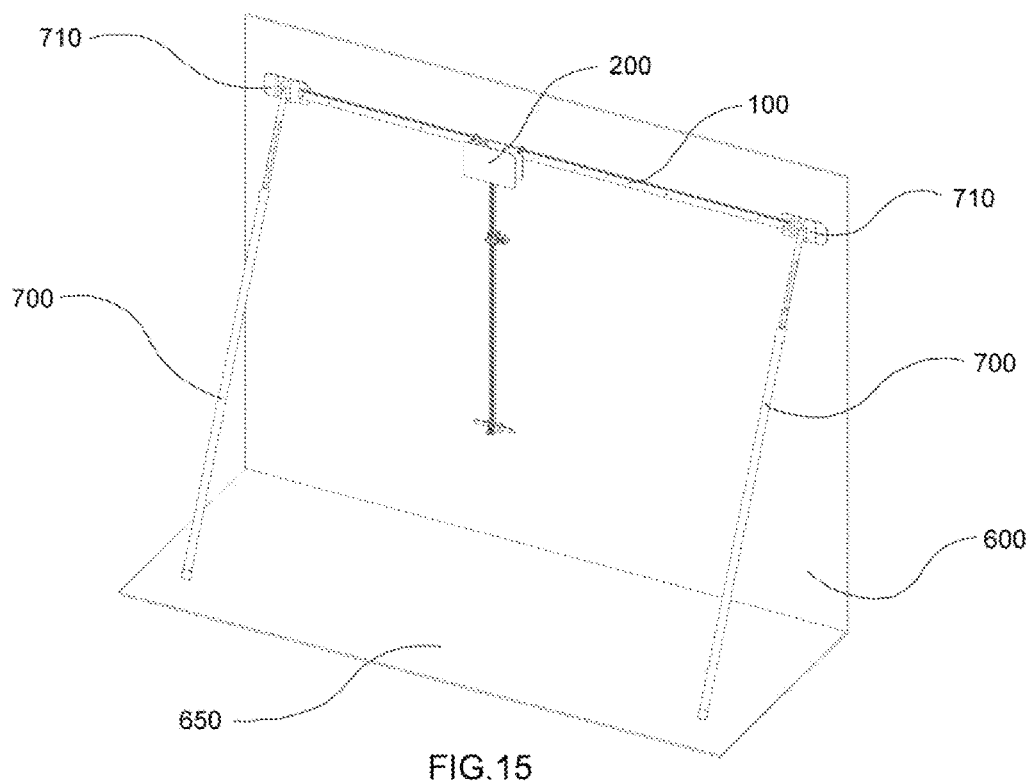

APPARATUS FOR OUTLINING ON VERTICAL SURFACE AND METHODS OF USE

CROSS-REFERENCE TO RELATED APPLICATION

This application claims the benefit of U.S. Provisional Application No. 62/331,637, having a filing date of May 4, 2016, the disclosure of which is hereby incorporated by reference in its entirety and all commonly owned.

FIELD OF INVENTION

The present invention relates to an apparatus for fast outlining and drawing images on a vertical surface. More specifically, the present invention relates to a microcontroller-based apparatus for damage-free mounting to a vertical surface for drawing images based on an uploaded digital file, and expandable in both the horizontal (X) and vertical (Y) directions to accommodate any image size. The apparatus is designed for ease of assembly/disassembly, for ease in transportation and requires substantially less floor space to operate it.

BACKGROUND

Homeowners and businesses use murals to personalize their space and create a unique atmosphere. Custom product and services oriented businesses, like wood shops, manufacture unique custom parts out of various materials. Theaters require custom sets to be made for new shows. Industries, architecture firms, universities use white/black boards to draw variety of schematics, plans, landscape layouts and drawings to make an active discussion of their projects. However, to create custom mural, part or template on a large scale either takes artistic skills or requires an outline. Few number of artists can free hand a large-scale mural but their time and availability is cost prohibitive to most businesses and homeowners. The said artist also specializes in a certain style, which may not align with the desired outcome. A number of techniques have been developed to create outlines on a large scale: stencils, image projection and grids.

Stencils can be used to aide in wall art outline and are transposed to a wall. However stencils are usually time consuming and tedious to make. They have limitations on complexity and styles. Image projection uses a type of projector to display an image on to a surface, and the image size may be adjusted. However image projection still requires the outline to be drawn by a person, which is a tedious and time consuming task. Moreover, image projection can be timely as a result of blocking the projected image while the artist draws and image projection is limited by ambient light conditions. A grid, a horizontal and vertical lines at equal distances superimposed on an image, can be drawn to aid in creating the outline. It is extremely difficult, tedious, requires high artistic skill and time consuming task. Graphical plotting alleviates these shortcomings.

There are three categories of Graphical plotting devices: (1) Roller, (2) Bed/Table and (3) Wire/Cable. The Roller type prints an image on paper that feeds from a roller. A pen carriage moves along a rectilinear travel path as the paper passes through the plotter. The Bed/Table type has a fixed bed or table and a pen carriage that can move in various directions over the bed surface. One drawback to both types (1) and (2) is that they are physically limited by the size of the paper or bed/table, respectively. Moreover, these types of devices cannot mount to a wall nor print directly to the wall. In general, these devices are not portable. These devices cannot draw an outline on a piece of wood or be used in small shops to create custom parts out of non-paper material. To outline an image on a non-paper material requires specialized equipment with high cost and such equipment require large floor space. The Wire/Cable type, however, can be directly attached to a vertical surface but the Wire/Cable robots are very slow, which is problematic to use for practical applications, especially for outdoor graphical plotting. Thus there remains an unmet need for a device that can attach to a wall or vertical surface in a damage-free manner and draw fast any complexity or style image of custom size in both the horizontal (X) and vertical (Y) directions, that is easy to remove and transport and require small floor space to operate.

SUMMARY OF INVENTION

The present invention seeks to solve the unmet needs noted herein. Notwithstanding, additional advantages may be afforded by one or a combination of embodiments presented herein in excess of what has been described herein, thus nothing herein is intended to limit the advantages or solutions to problems in the field of graphical plotters that the present invention solves. In solving the unmet need, that present invention provides at least a device that can attach to a wall or vertical surface in a damage-free manner and draw fast any complexity or style image of custom size in both the horizontal (X) and vertical (Y) directions, that is easy to remove and transport and require small floor space to operate.

The present invention provides for a wall mountable system for automated drawing of an image upon a wall which includes a mounting track for mounting on a wall, a robot for traveling along said mounting track, said robot further comprising a y-track rigidly mounted to said robot, said y-track extending from the robot and perpendicular to the mounting track; and an end effector, said end effector traveling along the y-track of said robot, said end effector further comprising at least one pen, wherein said pen is selected from the group consisting of: stylus, a pen, a pencil, a marker, a crayon, chalk, charcoal, painting tool, paint pen, laser cutter, laser diode, engraving device, glass etching, router, mechanical cutter or combinations thereof. It is intended that the mounting track is mounted horizontally to a wall wherein said wall is selected from the group consisting of: interior/exterior wall, wood panel/wall, concrete wall, glass, plastic, chalk board, metal sheet, plywood, paper, cardboard or any combinations thereof.

The present invention provides additional unique features by providing, for example, an expandable mounting track having a first end, a second end and an intermediate extent therebetween. Novel mounting tracks are further used, for example one embodiment employs mounting tracks that are mounted to the wall using a damage-free adhesive, or in other embodiments using at least one adjustable extension pole angularly positioned between the mounting track and the ground to provide both horizontal and vertical support to the horizontal rack to maintain the horizontal track against the vertical surface.

The robot further includes certain novel features. For example in at least one embodiment, the robot includes wheels or gears that can attach to and engage with the mounting track. In addition in some embodiments, the y-track rigidly mounted to the robot is also extendable. The robot in certain embodiments utilizes a communication means to control the position of the end effector along the y-track. For example in at least one embodiment the robot transmits power and communicates to the end effector using a conductive wire or strips along the y-track.

The robot, the horizontal track (x-track), the vertical track (y-track), the end effector, the mounting tracks, and the system, in general, contain additional elements, embodiments and features, each further described herein.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 4 is a blown up view of the robot 200 with the cover removed as to show the various components that the robot 200 is comprised of.

FIG. 15 illustrates alternative non-damage method for fast mounting of the system on the wall.

DETAILED DESCRIPTION

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

Various terms used throughout the specification and claims are defined as set forth below as it may be helpful to an understanding of the invention.

As used herein a "pen" shall mean a pen, a pencil, a marker, a crayon, chalk, charcoal, painting tool, paint pen, laser cutter, laser diode, engraving device, glass etching, router, mechanical cutter or combinations thereof.

As used herein a "wall" shall mean a vertical surface that can be interior/exterior wall, wood panel/wall, concrete wall, drywall, glass, plastic, chalk board, metal sheet, plywood, paper, cardboard or any combinations thereof. Vertical surfaces can also hold raw materials such as paper, metal sheet, cardboard, etc on a wall and be drawn on or combinations thereof.

As used herein a "drawing" shall mean drafting, outlining, plotting, engraving, etching, cutting, burning or drawing or combinations thereof.

As used herein a "servo" shall mean servo motor, a servo, a stepper motor, a motor (DC or AC), or combinations thereof.

Figure 1:
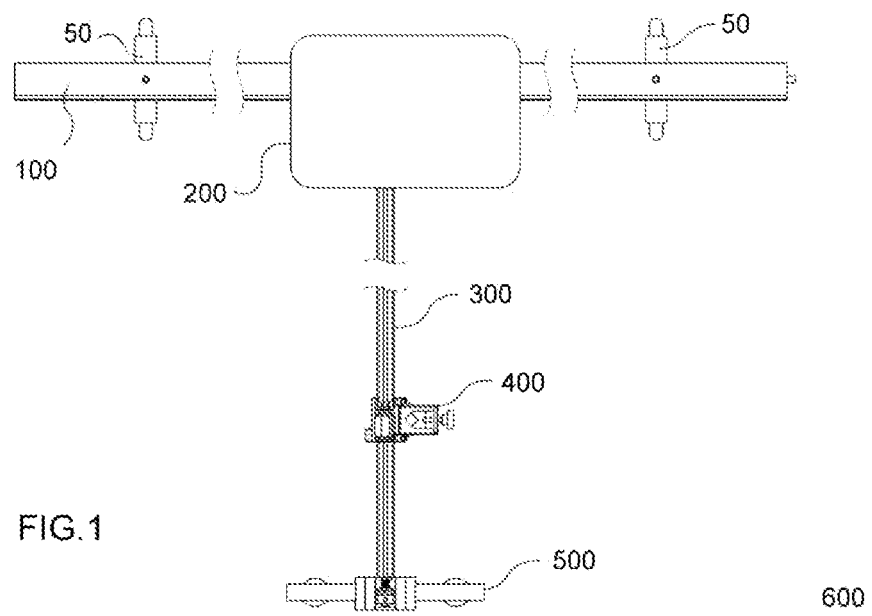
FIG. 1 is a front view of the entire system when it is set up and hanging on vertical surface 600.

A mountable system for automated drawing of a digital file upon a wall is provided on FIG. 1. The system includes a mounting track 100 for mounting on a wall 600, a robot 200 for traveling along the mounting track 100, and an end effector 400. In order for the system to plot on both the horizontal and vertical axis, the robot 200 further includes a y-track 300, rigidly mounted to the robot 200, which extends from the robot 200 perpendicular to the mounting track 100. In addition, in order to perform the actual plot, the system further includes an end effector 400, which travels along the y-track 300 of the robot 200. The end effector 400 includes a pen 413. FIG. 1 illustrates at least one embodiment of the present invention. A mounting track 100 is attached to a wall 600 by the mounting brackets 50. A robot 200 travels along the mounting track 100. A y-track 300 that extends from the robot 200 is attached to the robot 200 such that this y-track 300 is perpendicular to the mounting track 100. An end effector 400, capable of holding a pen, travels along the y-track 300. In at least one embodiment, a bottom bracket 500 is attached to the bottom of the y-track 300.

Mounting Track 100

Figure 8A:
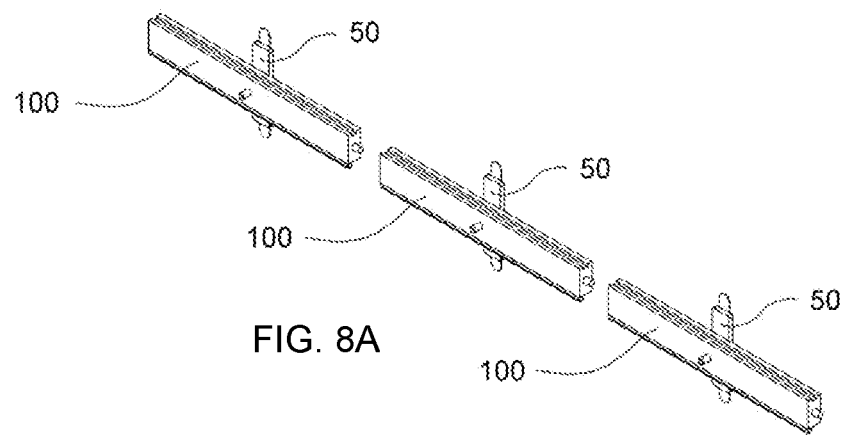
FIG. 8A is an exploded view of a plurality of mounting tracks 100 which can be assembled to form a custom length track.
Figure 8B:
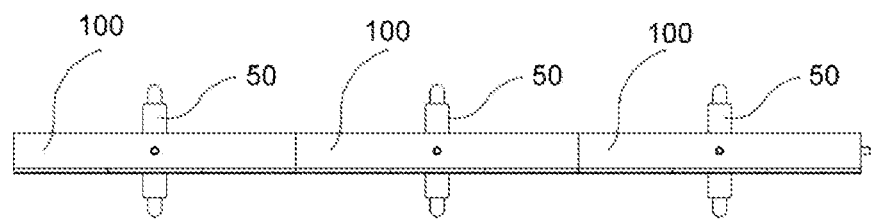
FIG. 8B is an assembly view of the plurality of mounting tracks to form a single track.
Figure 10:
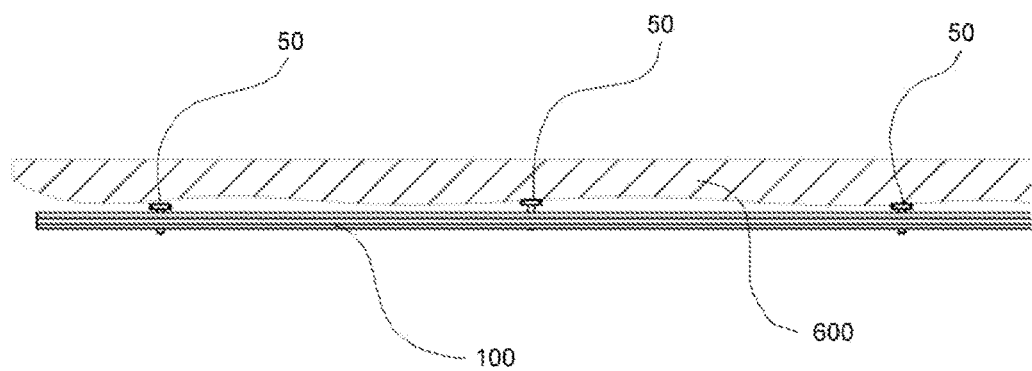
FIG. 10 illustrates a top view of the mounting bracket(s) 50 mounted to an uneven mounting surface keep the mounting track 100 straight.

The mounting track 100 is intended to be attached horizontally to a wall by mounting brackets 50 to support and guide the robot 200 in horizontal direction. The mounting track 100 has a first end, a second end and an intermediate extent 105 therebetween. The mounting track 100 further includes a front side and a backside. The first end and second end of a single mounting track 100 can fit together to form longer length mounting track 100 as illustrated in FIG. 8. The intermediate extent 105 has at least one or a plurality of fixed toothed rack(s) 106 that can engage with a pinion gear 115 on a robot 200. In at least one embodiment, the cogs or toothed racks 106 are evenly spaced such that the robot 200 can determine its position relative to the mounting track 100 for drawing an image. The intermediate extent 105 has a plurality of small openings 107, 108 that pass from the backside through the front side. A mounting bracket 50 compromises of backing plate 113 and a dowel 110 having a distal end 111 and a proximal end 112. The dowel 110 can be inserted into the small opening 107, 108 on the intermediate extent 105. In at least one embodiment, the backing plate 113 of the mounting bracket 50 is mounted to the wall using a damage-free adhesive(s) 114. In other embodiments, the mounting bracket 50 can use damage-free methods of attaching to a wall: magnetic, electro-magnetic, or a vacuum suction systems. A permanent attachment via fasteners or glue is also possible to attach the mounting bracket 50 to a wall. The function of the mounting bracket 50 is to attach the mounting track 100 to a wall or to an uneven wall. FIG. 10 illustrates a top view of uneven wall and how mounting bracket 50 attaches to the surface, while keeping the mounting track 100 straight, not bent. The mounting track 100 can remain on wall 600 while the robot is not used and not attached.

Figure 2:
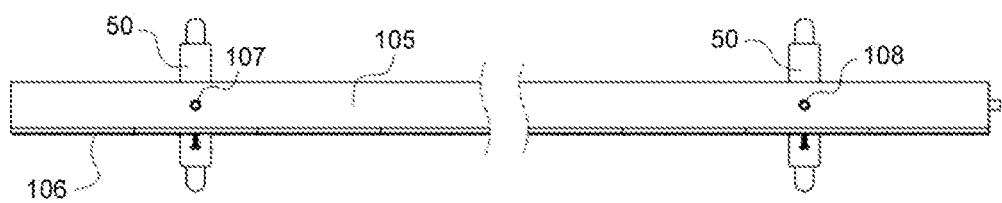
FIG. 2 illustrates a blown up view of an intermediate extent 105 of the mounting track 100.
Figure 3:
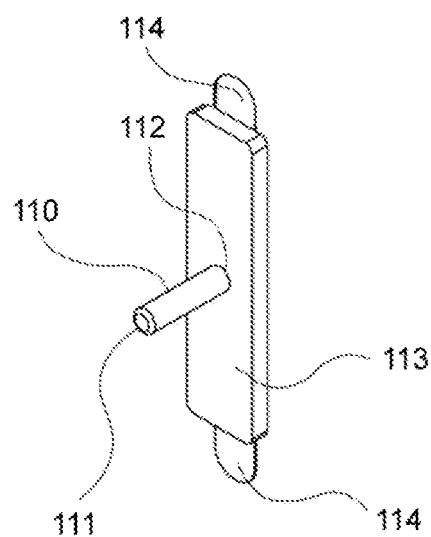
FIG. 3 illustrates a blown up view of the mounting brackets 50 that will attach the mounting track 100 to a wall 600.
Figure 13:
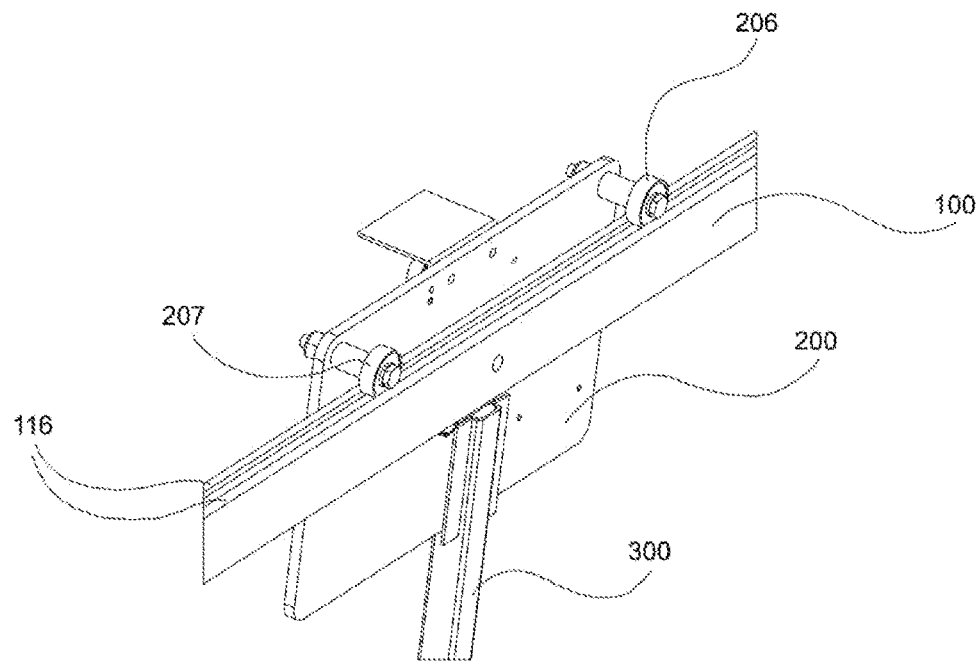
FIG. 13 is one embodiments of a top perspective view of the robot 200 and mounting track 100.

FIGS. 2&3 further illustrate the mounting track 100 and the intermediate extent 105. The intermediate extent 105 has a toothed rack 106. The intermediate extent 105 has a groove cut out for wheel assembly 206, 207 as shown on FIG. 13. The intermediate extent 105 has a plurality of small openings 107, 108 that pass completely through the intermediate extent 105. A dowel 110 is attached such that the distal end 111 of the dowel 110 (in relation to the backing plate 113) is inserted into the intermediate extent's 105 small openings 107, 108. The proximal end 112 of the dowel 110 is connected to a backing plate 113. The backing plate 113 is attached to a wall. In at least one embodiment, a damage-free adhesive 114 is used. The intermediate extent 105 can be any length. In one embodiment, the dowel 110 may tilt vertically in a small angle to adapt the backing plate 113 to uneven wall.

It is appreciated that the mounting track 100 and its components can be made of many suitable materials known in the art. For example, the dowel 110, intermediate extent 105, cogs/teeth, or backing plate 113 may be made of wood, metal, plastic, ceramic, or combinations thereof.

Figure 12:
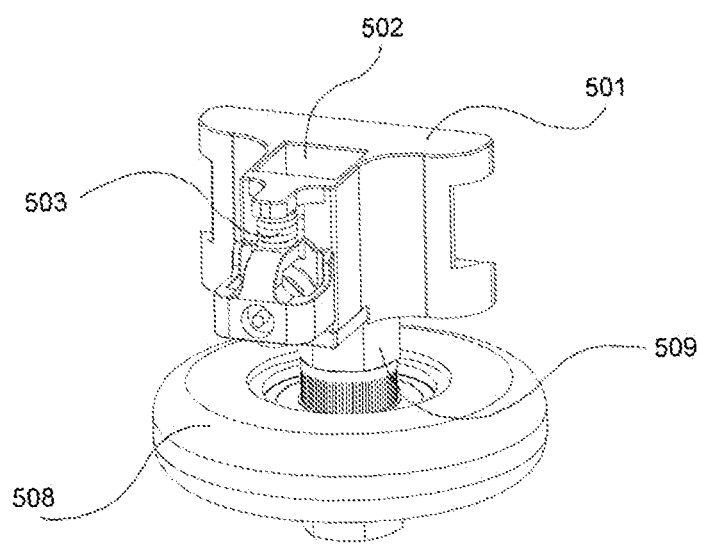
FIG. 12 illustrates a perspective view of the bottom bracket 500 with a wheel 508 for stabilization of y-track.

In at least one embodiment, an additional track on the bottom of the apparatus may provide additional stability, especially in instances where the present invention is used on tall walls. The additional track may include a wheel or some other means for engaging with the apparatus. Without being bound by any particular theory, the additional track may be used to assist in keeping the y-track 300 rigidly mounted to the robot 200 and spaced evenly from the wall for the entire length of the vertically y-track 300. It is appreciated that the construction of the additional track on the bottom may be similar to that of the mounting track 100 used for the top. FIG. 12 shows a wheel 508 connected at the end of the y-track 300 for riding along the bottom track allowing for the y-track 300 to stay parallel relative to the wall for the entire length of the y-track. The wheel 508 is controlled by additional x-stepper motor 509 to synchronize the movement of the robot 200 and the bottom of y-track 300. The additional wheel 508 can be used without the bottom track.

FIG. 15 illustrates alternative non-damage method for fast installation of the system on the wall 600. The mounting track 100 is horizontally leveled and supported by (2) two adjustable extension poles 700. Both ends of the mounting track 100 are connected to the top of the adjustable extension poles 700 by adapters 710. The bottom ends of the adjustable extension poles 700 have non-slip inserts sitting on the ground or a floor 650. This method also allows to draw fragments of a large mural/drawing by easily shifting the draw area up and down, left and right without any need to permanently attach the system.

Bottom Bracket 500

Figure 9:
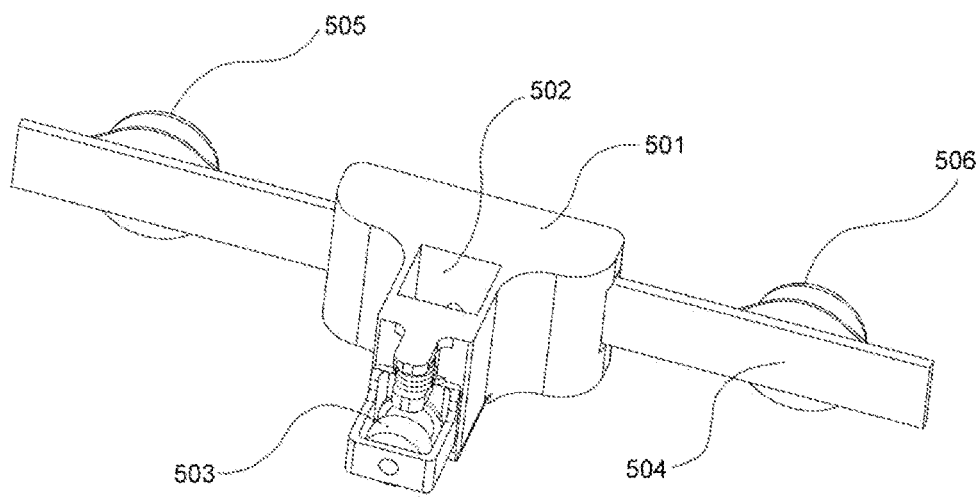
FIG. 9 illustrates a perspective view of the bottom bracket 500 illustrating its constituent elements.

FIG. 9 depicts the bottom bracket 500 in more detail. A bottom mount 501 has a bottom mount opening 502 such that it can attach to the end of the y-track 300 rigidly. A pulley tensioner assembly 503 is attached on the bottom mount 501. A bottom bracket strip 504 is inserted into the mount 501. In at least one-embodiment feet 505, 506 may be used to act as a guide, provide friction and distribute any rotational force to the wall. It is appreciated that the construction of the bottom track may be similar to that of the horizontal track used for the top.

Robot 200

Figure 4:
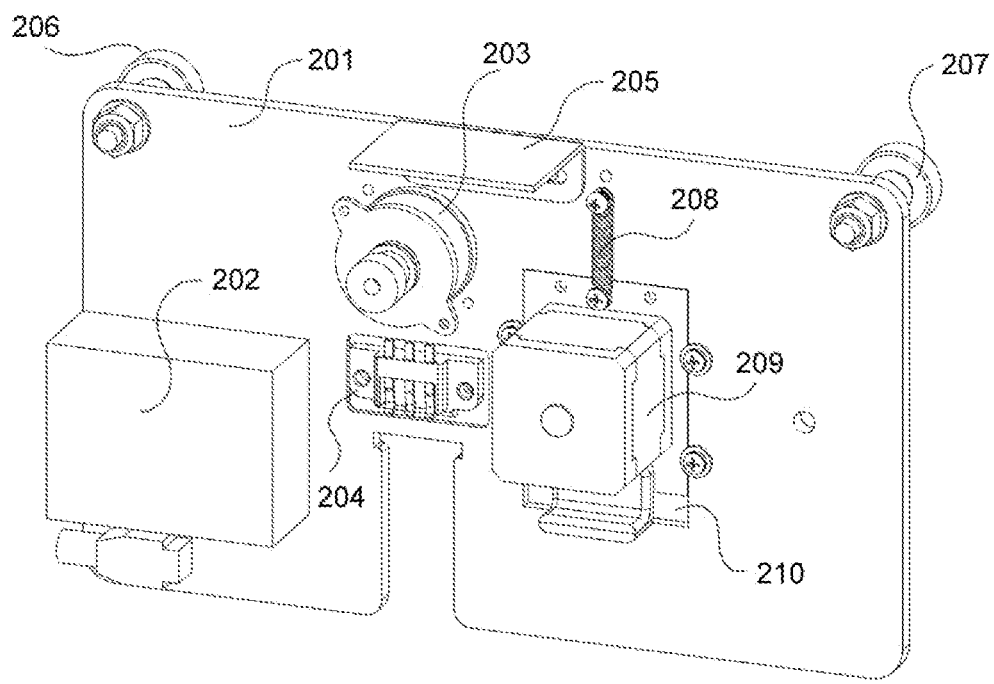

FIG. 4 the robot 200 provides the essential function of the present invention, which is to receive a communicated image, and to plot the image on a wall by traveling along the mounting track 100, and controlling the position of the end effector 400 having a pen along the y-track 300 that is rigidly mounted to the robot 200. The robot 200 includes wheel assembly 206, 207, teeth and gears that attach to and engage with the mounting track 100 so that the robot 200 may travel about the mounting track 100. Without intending to limit the invention, the robot 200 may, upon initiation of a drawing, ride along the mounting track 100 in order to count the number of teeth or cogs so that the robot 200 may determine the extent of which it is able to plot the desired image. The robot 200 may also use encoders attached to x-motor 209 or y-motor 203 or both to determine its location relative to the drawing area.

Figure 5:
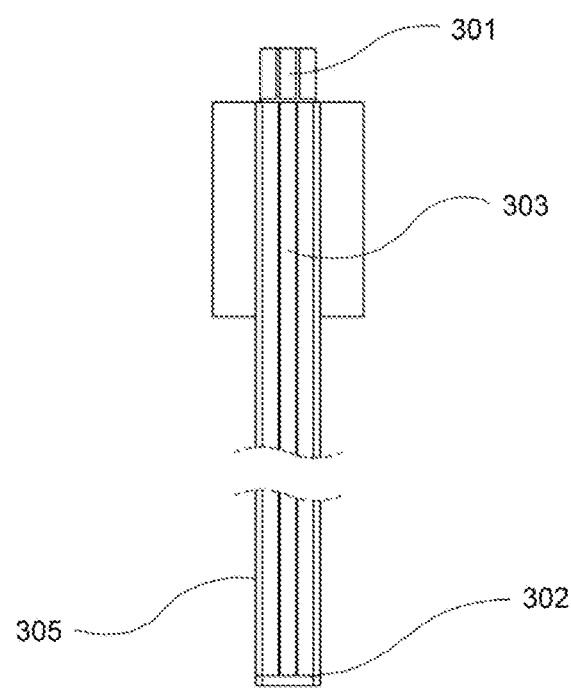
FIG. 5 is a front view of the y-track 300 with intermediate extents 305.

The robot 200 further includes a rigidly mounted y-track 300, which is perpendicular to the mounting track 100. The y-track 300 is illustrated in FIG. 1. The y-track 300 provides the end effector 400 the ability to move in the vertical direction. The y-track 300 also supplies electrical power and signals from the robot 200 to the end effector 400 to control the position of the pen 413. The y-track 300 includes a first end, a second end and an intermediate extent 305 therebetween. In at least one embodiment, the intermediate extent 305 may be a plurality of intermediate extents 305 which may be connected or removed to lengthen or shorten the y-track 300. FIG. 5 illustrates a portion of the y-track 300. The y-track 300 can be made of many suitable materials known in the art such as wood, metal, plastic, or otherwise. The y-track 300 can be square, rectangular or circular in profile to provide the right rigidity to the system. As illustrated by FIG. 5, the first end has a y-track male electrical connector 301 that can attach to the robot 200 and draw power/signal. The second end has a female connector 302. The y-track 300 may have conductive strips 303 travels along one side or multiple sides of the y-track 300. In at least one embodiment, the conductive strips 303 is a copper wire.

FIG. 4 illustrates the internal components of at least one embodiment of the robot 200. The internal of the robot 200 include a robot base plate 201, a CPU 202 attached to the robot base plate 201. A y-motor 203 is attached to the robot base plate 201; the y-motor 203 and x-motor 209 are connected to the CPU 202. A y-track female electrical connector 204 is attached to the robot base plate 201. A hinge 205 is attached to the top of the robot base plate 201. The second end of the hinge 205 is attached to a cover plate (see FIG. 1 for the robot 200 which has the cover in place). Wheel assembly 206, 207 are mounted to the top corners of the robot base plate 201. The release spring 208 is attached to an x-motor 209 and the robot base plate 201. An x-motor slot 210 limits the x-motor 209 motion to vertically. The release spring 208 allows user to disengage the robot 200 from the mounting track. The release spring 208 allows the pinion gear 115 on x-motor 209 to stay engaged to the toothed rack 106 during operation as shown on FIG. 14.

The robot 200 further includes a communication means to control the position of the end effector 400 traveling along the intermediate extent 305 of the y-track 300 rigidly mounted to the robot 200. In at least one embodiment, the robot 200 communicates with the end effector 400 using the electro-conductive strips. In at least one embodiment, the communication means is three (but not limited by three) conductive strips 303 made out of conductive material that runs the length of the y-track 300. The y-track male electrical connector 301 connects to the y-track female electrical connector 204 in order to supply power and signal to the end effector 400 without the need of wires.

The robot 200 communicates with external computing device, smart phone, handheld computer, personal computer, personal digital assistance (PDA) by cables or wirelessly. The electrical power supplies to the robot 200 by directly connected cable to CPU 202 or through conductive strips 116 attached to the mounting track 100 as shown on FIG. 13.

End Effector 400

The end effector 400 interfaces with the y-track 300 that is attached to the robot 200. The end effector 400 provides the means for plotting the image on the wall through the use of a pen attached to the end effector 400. In at least one embodiment, an end effector motor 415 is attached to the end effector 400, wherein the end effector motor 415 controls the pen 413 position, such that the end effector motor 415 may lift or engage the pen 413 where needed. The end effector motor 415 allows for the drawing to be discontinuous. The end effector 400 travels up and down along the y-track 300 attached to the robot 200 providing the relative position on the vertical coordinate plane (Y), while the robot 200 travels along the mounted track 100 to provide the position relative to the horizontal coordinate plane (X). An end effector motor 415 can be replaced by a servo motor, solenoid, DC motor, stepper motor or another actuator that lifts and engages the pen 413.

Figure 6:
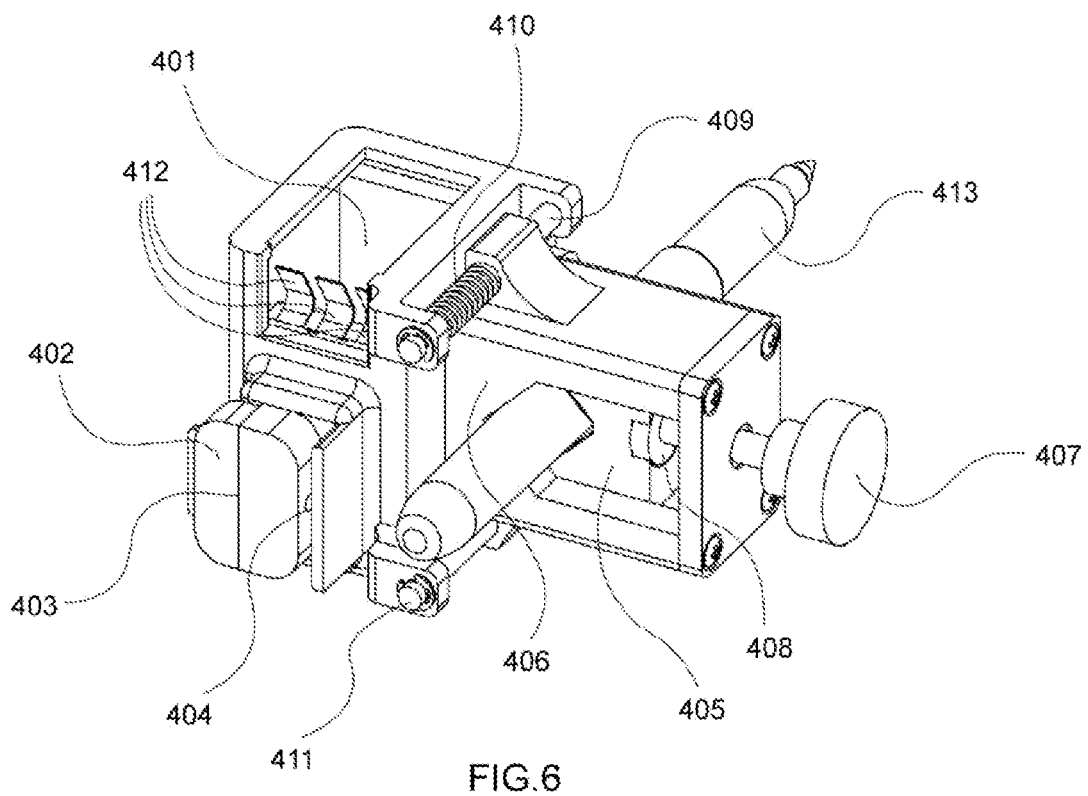
FIG. 6 illustrates a blown up view of the end effector 400 and a perspective view of one at least one embodiment of a drawing tool attached to the end effector 400.
Figure 7:
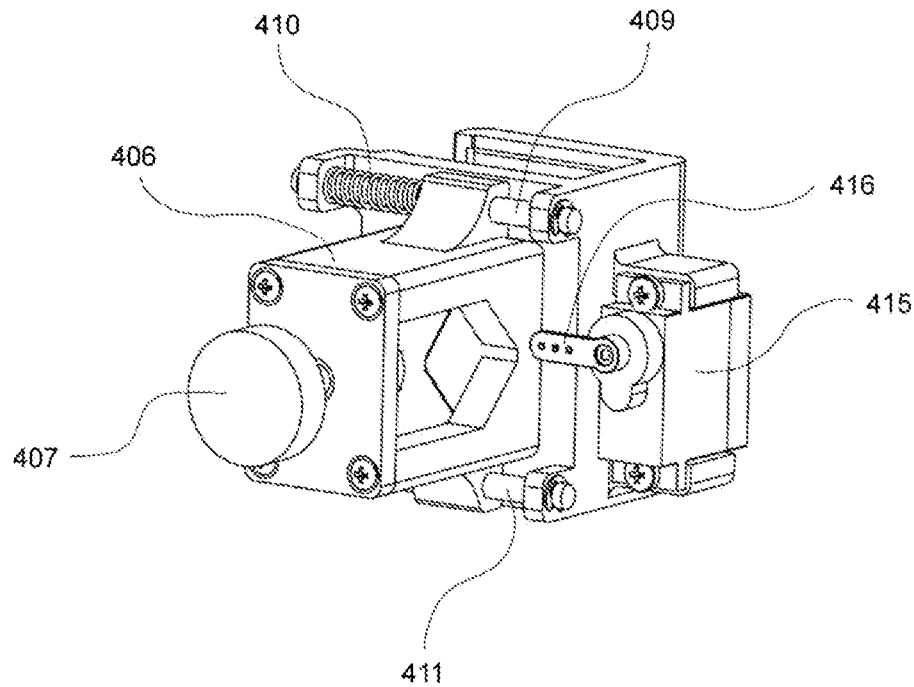
FIG. 7 is a rotated view of the end effector 400 without the pen.
Figure 11:
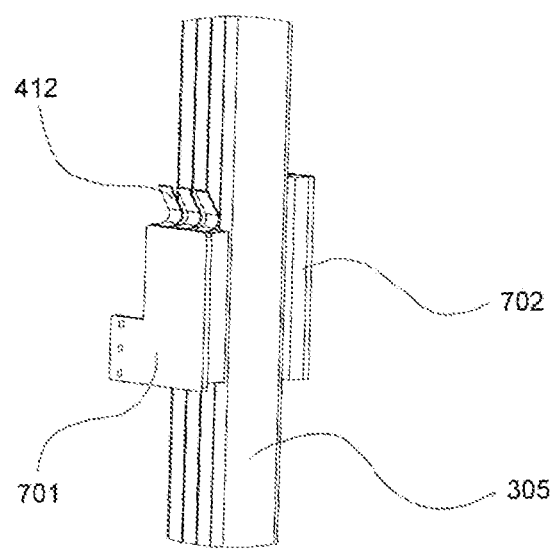
FIG. 11 is a detailed view of the y-track 300 and the inside parts of the end effector 400.

At least one embodiment of the end effector 400 is more particularly illustrated in FIGS. 6&7 which illustrates a rectangular hollow housing 401 seated over the y-track 300 such that the y-track 300 passes through the rectangular hollow housing 401. A peripheral extent 402, has two parallel slots 403, 404. A timing belt (not depicted) seats in each slot 403, 404. One slot has a mean for attaching the end effector 400 to the timing belt, the other slot is merely a guide for the timing belt. The timing belt makes a closed loop over y-motor's 203 pulley at the top and over a pulley at the pulley tensioner assembly 503 on the bottom mount 501. A pen cradle 406 is attached to the side of the end effector 400. A pen cradle 406 creates an opening for a pen 413. A thumbscrew 407 has a mean to fix a pen by pushing the pen clamp 405. A thumbscrew 407 end is attracted to the backside of a pen clamp's magnet 408, the second end having a thumbscrew. A shaft 409, 411 is inserted through tabs on the end effector 400 and the pen cradle 406 so it can slide over the shafts 409, 411. A compression spring 410 is inserted over the shaft 409. An end effector motor 415 is attached to the backside of the end effector 400. The end effector motor 415 has an end effector motor arm 416. The end effector motor arm 416 is capable of pushing against the pen cradle 406 such that the pen cradle 406 will move to an unseated position when the end effector motor 415 is engaged. When the end effector motor arm 416 is not engaged, the compression spring 410 instantaneously adjusts the pen position allowing for drawing on uneven walls without discontinuity of the line of the drawing. The end effector feet 412 engage with conductive strips 303 of the y-track 300 to draw signal and electrical power from the robot 200. FIG. 11 shows parts inside of the rectangular hollow housing 401. In one embodiment, end effector electrical connector 701 has electrical feet connected to a PCB board, which feeds power and signal to the end effector motor 415 by electrical wires from conductive strips 303. A pressure pad 702 can be used to vary the pressure and friction of the end effector 400 on the y-track 300.

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1

FIG. 8 shows a horizontally extended wall mountable system for automated drawing of a mural, technical drawing or template outline upon a wall which includes an extended mounting track 100 for mounting on a wall which has three (3) intermediate extents. The mounting track 100 is mounted to the wall using a damage-free adhesive 114, which is connected between the wall and the backing plate 113. Each backing plate 113 has a dowel 110 that connects to the mounting track 100 of each intermediate extent 105. Each intermediate extent 105 has two (2) openings for connecting a dowel 110 and backing plate 113 for mounting. Each mounting track 100 is leveled while being attached to the wall such that the whole extended mounting track is horizontally leveled. The dowels 110 are self leveling by tilting vertically up and down within a small angle inside the backing plate 113 to adapt the backing plate 113 to uneven wall.

Figure 14:
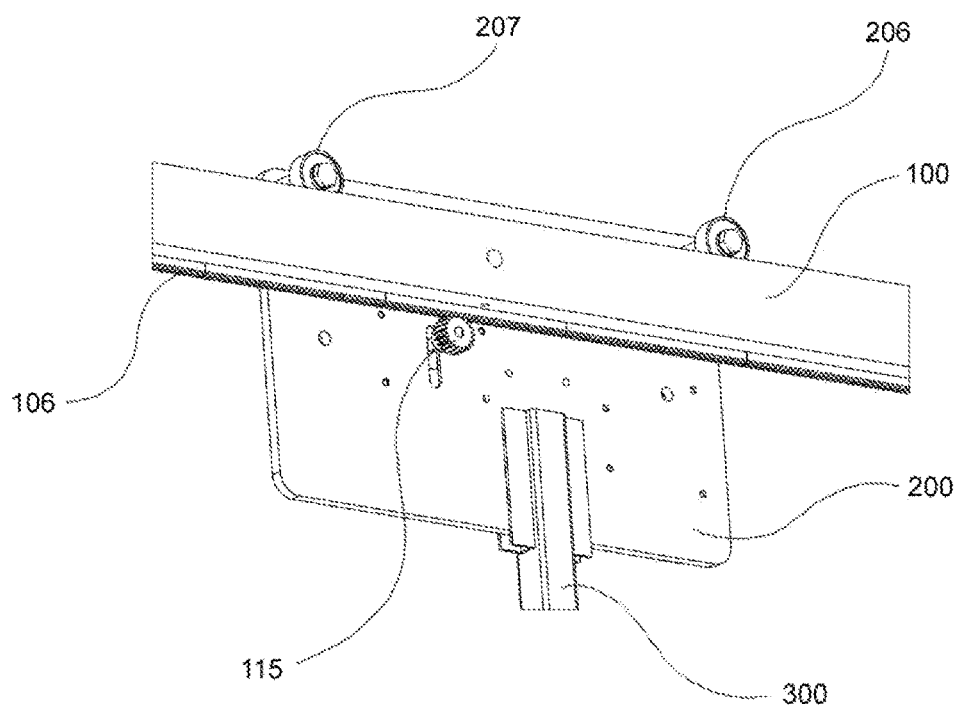
FIG. 14 is one embodiments of a bottom perspective view of the robot 200 and mounting track 100.

A robot 200 having a y-track 300 rigidly mounted to said robot 200 is engaged upon the horizontally mounted mounting track 100 with a pinion on the x-motor 209 shown in FIG. 14. The y-track 300 extending from the robot 200 is perpendicular to the mounting track 100. The wheel assembly of robot 200 may travel inside a groove shown in FIG. 13.

An end effector 400, having a servo as the end effector motor 415 is engaged to the y-track 300, where the end effector 400 travels along the y-track 300 (in the vertical direction) while communicating with the robot 200 via conductive strips 303 running the length of the y-track. The conductive strips 303 are connected to y-track electrical connector 301 that in turn is mated to the y-track female electrical connector 204 on the robot 200. The conductive strips 303 allow instructions to be delivered from the robot 200 to the end effector 400 to control the servo motor and the pen movements for drawing the desired image. When said servo is not energized, the compression spring 410 instantaneously pushes the pen to the wall, adjusting to any imperfections and deviations of the said wall. FIG. 6 shows one example of a pen inside the end effector 400.

The robot 200 first receives an image file uploaded from a remote location or a memory storage device connected to the CPU 202. The robot 200 then initializes by traveling the length of the mounting track 100 to define its vertical axis, and then moves the end effector 400 along the y-track 300 to determine its horizontal axis. The robot 200 positions the end effector 400 by moving about the horizontal axis and moving the end effector 400 about the vertical axis. When the robot 200 is ready to draw, the robot 200 communicates a signal to the servo on the end effector 400, whereby the servo engages the pen to the wall. The end effector 400 and robot 200 move in relation to each other to move the pen based on the drawing received by the robot 200 and reproduce the drawing on the wall. The robot 200, end effector 400, bottom bracket 500 and y-track 300 are removed from the wall as one unit by pushing the x-motor 209 down with one hand and lifting the system off from the mounting track 100 with another.

Example 2

The system provided in Example 1 is used, but further includes a bottom track mounted similar and parallel as the top mounting track 100. A wheel is connected at the end of the y-track 300 for riding along the bottom track allowing for the y-track 300 to stay parallel relative to the wall for the entire length of the y-track.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The invention claimed is:

1. A system for automated drawing an image upon a substantially planar vertical wall, the system comprising:
   a. a mounting track;
   b. connecting means for detachably connecting the mounting track to the vertical wall in a substantially horizontal orientation;
   c. a robot movably connected to, and traveling along said mounting track in a horizontal direction and having a y-track rigidly mounted to and extending from the robot at a proximal end and being perpendicular to the mounting track, and having a distal end slidably engaging the vertical wall; and
   d. a drawing instrument movably connected to and traveling along the y-track of said robot in a vertical direction and with movement of the robot along the mounting track in a horizontal direction to create the image on the vertical wall.

2. The system of claim 1, wherein said drawing instrument is selected from the group consisting of a pen, a stylus, a pencil, a marker, a crayon, a piece of chalk, a piece of charcoal, a painting tool, a paint pen, or combinations thereof.

3. The system of claim 1, wherein the vertical wall is selected from the group consisting of a stationary interior wall of a room, a stationary exterior wall of a building, and a stationary masonry wall.

4. The system of claim 1, wherein the connecting means includes at least two mounting pins detachably connected to and extending outwardly from the vertical wall, and adjustably and detachably engaging openings formed in the mounting track to fix the mounting track in a substantially horizontal orientation relative to the vertical wall.

5. The system of claim 4, wherein each mounting pin extends outwardly from a mounting plate, and each mounting plate is detachably connected to the vertical wall at spaced intervals.

6. The system of claim 5, wherein each mounting plate has a first side surface and a second side surface, wherein each pin extends outwardly from the first side surface, and the second side surface is provided with an adhesive material for detachable connecting each mounting plate to the vertical wall.

7. The system of claim 1, wherein said robot includes means for moving the robot along the mounting track.

8. The system of claim 7, wherein said moving means includes gears, motors and a CPU arranged to cause the robot to move along the mounting track in response to a control signal.

9. The system of claim 1, wherein the system further includes a bracket connected to the distal end of the y-track, the end bracket including means for slidably engaging the vertical wall during movement of the robot.

10. The system of claim 1, wherein said robot further comprises communication means for controlling a position of the drawing instrument through movement along a length of the y-track.

11. The system of claim 1, further comprising conductive strips disposed within or along the y-track to transmit power and control signals to the drawing instrument.

12. The system of claim 1, wherein said drawing instrument further comprises means for holding the drawing instrument, and a motor for moving the holding means in a controlled manner.

13. The system of claim 12 wherein said motor, when energized, overcomes tension of a spring, lifting the holding means away from the substantially planar surface, whereby when the motor is not energized the spring instantaneously adjusts the pressure and distance of the holding means in order to always be engaged with the substantially planar surface.

14. The system of claim 1, wherein said mounting track includes a first end, an opposite second end, and a plurality of holes disposed along the mounting track at spaced intervals between the opposite ends, and wherein the connecting means includes at least two mounting plates, each having first and second opposite side surfaces, a dowel pin extending outwardly from the first side surface and an adhesive material provided on the second side surface, wherein the mounting plates are detachably connected to the vertical wall with the adhesive material at approximately opposite end portions of the mounting track and positioned so that the dowel pins of each respective mounting plate fits within corresponding holes in the mounting track.

15. The system of claim 1, wherein said y-track has a front side, three other sides, a first end, a second end and an intermediate extent therebetween, the first and second ends have a male and female connector to attach an extension, and at least one side having a conductive strip; the first end having a y-track male electrical connector that can attach to the robot; and the second end having a pulley on the front side.

16. The system of claim 1 wherein said robot further comprises:
   a. a robot base plate having a front side, a back side, a top and a bottom;
   b. a CPU attached to the robot base plate;
   c. a y-motor attached to the middle of the robot base plate, the y-motor being connected to the CPU;
   d. a y-track female electrical connector attached to the robot base plate juxtaposed the y-motor;
   e. a hinge having a first end and a second end, the first end attached to the top of the robot base plate, the second end attached the cover plate; and
   f. the back side of the robot base plate having a top, bottom, left and right side, and
   further comprising a wheel assembly attached near each of the top right and left corner.

17. The system of claim 1, wherein said robot further comprises a release spring for disengaging said robot from said mounting track, wherein the release spring engages a pinion on an x-motor with a toothed rack on the mounting track, wherein the robot can be disengaged from the mounting track by pushing the x-motor down with one hand and removing it with the other hand.

18. The system of claim 1, wherein the connecting means including at least one adjustable extension pole for bracing the mounting track against the substantially planar surface, wherein said extension pole is angularly positioned between the mounting track and the ground to provide both horizontal and vertical support to the mounting track.

19. An apparatus for drawing on a vertical wall, comprising:
- a first track detachably mounted on the vertical wall in a horizontally disposed position, and providing an x axis path of movement;
- a first car movable along the first track by a first computer controlled motor;
- a second track having a first, proximal end connected to the first car and extending vertically downwardly from the first car and terminating in a free, distal end, and providing a y axis path of movement;
- a second car movable along the second track by a second computer controlled motor; and
- an instrument detachably connected to the second car, the instrument being selected from the group consisting of a drawing, painting, etching and cutting instrument, and being movable to and away from the vertical wall by a third computer controlled motor, and providing a z axis path of movement,
- whereby the instrument is capable of producing any number and kind of images on the vertical wall depending on programs executed by at least one CPU.

\* \* \* \* \*